US011913293B2

(12) United States Patent
Magnuson et al.

(10) Patent No.: US 11,913,293 B2
(45) Date of Patent: Feb. 27, 2024

(54) SLIP WEAR DETECTION

(71) Applicant: Canrig Robotic Technologies AS, Sandnes (NO)

(72) Inventors: Christopher Magnuson, Houston, TX (US); Markus Buchholz, Stavanger (NO)

(73) Assignee: Canrig Robotic Technologies AS, Sandnes (NO)

( * ) Notice: Subject to any disclaimer, the term of this patent is extended or adjusted under 35 U.S.C. 154(b) by 290 days.

(21) Appl. No.: 17/099,361

(22) Filed: Nov. 16, 2020

(65) Prior Publication Data

US 2021/0156209 A1 May 27, 2021

Related U.S. Application Data (60) Provisional application No. 62/941,421, filed on Nov. 27, 2019.

(51) Int. Cl.
*E21B 19/16* (2006.01)
*G06T 7/73* (2017.01)
*E21B 19/10* (2006.01)
*G06T 7/00* (2017.01)

(52) U.S. Cl.
CPC ............ *E21B 19/165* (2013.01); *E21B 19/10* (2013.01); *G06T 7/001* (2013.01); *G06T 7/74* (2017.01); *G06T 2207/30164* (2013.01)

(58) Field of Classification Search
CPC ....... E21B 19/10; E21B 19/165; G06T 7/001; G06T 7/74; G06T 2207/30164
See application file for complete search history.

(56) References Cited

U.S. PATENT DOCUMENTS

| 9,322,950 | B2 | 4/2016 | Gustavsson et al. |
| 9,464,492 | B2* | 10/2016 | Austefjord ............ B66C 13/085 |
| 9,657,539 | B2 | 5/2017 | Gupta et al. |
| 9,706,185 | B2 | 7/2017 | Ellis |
| 10,196,867 | B2 | 2/2019 | Mailly et al. |
| 10,366,507 | B2 | 7/2019 | Amezaga et al. |

(Continued)

FOREIGN PATENT DOCUMENTS

| GB | 2556111 A | 5/2018 |
| WO | 2012/165951 A2 | 12/2012 |

(Continued)

OTHER PUBLICATIONS

International Search Report from PCT/EP2020/082440 dated Jan. 22, 2021, 1 pg.

*Primary Examiner* — Christopher J Sebesta
(74) *Attorney, Agent, or Firm* — Abel Schillinger, LLP (57) ABSTRACT

A system for conducting a subterranean operation can include a retention feature in a drill floor with the retention feature configured to suspend a tubular string from the drill floor via engagement of the retention feature with the tubular string, an imaging system configured to capture images of a visible feature on a portion of the tubular string that extends above the drill floor; and a processor configured to detect a change in a position of the visible feature while the tubular string is engaged with the retention feature, and the processor being configured to calculate a wear status of the retention feature based upon the change in the position of the tubular string.

20 Claims, 5 Drawing Sheets

(56) References Cited

U.S. PATENT DOCUMENTS

| | | |
|---|---|---|
| 10,422,188 B2 | 9/2019 | Zheng et al. |
| 10,450,038 B2 | 10/2019 | Vandenworm |
| 2003/0118230 A1 | 6/2003 | Song et al. |
| 2016/0130889 A1 | 5/2016 | Torrione |
| 2017/0314369 A1 | 11/2017 | Rosano et al. |
| 2017/0362905 A1* | 12/2017 | Mailly ................ G06K 9/6282 |
| 2019/0057516 A1* | 2/2019 | Amezaga ................ G06T 7/74 |
| 2019/0136650 A1 | 5/2019 | Zheng et al. |
| 2019/0136669 A1 | 5/2019 | Wiedecke et al. |
| 2019/0195034 A1 | 6/2019 | Leite |
| 2020/0126386 A1* | 4/2020 | Michalopulos ......... G06T 17/00 |

FOREIGN PATENT DOCUMENTS

| | | |
|---|---|---|
| WO | 2013/048260 A2 | 4/2013 |
| WO | 2019/013644 A1 | 1/2019 |
| WO | 2019/018153 A1 | 1/2019 |
| WO | 2019/174691 A1 | 9/2019 |

\* cited by examiner

SLIP WEAR DETECTION

CROSS-REFERENCE TO RELATED APPLICATION(S)

This application claims priority under 35 U.S.C. § 119(e) to U.S. Patent Application No. 62/941,421, entitled "SLIP WEAR DETECTION," by Christopher MAGNUSON et al., filed Nov. 27, 2019, which application is assigned to the current assignee hereof and incorporated herein by reference in its entirety.

TECHNICAL FIELD

The present invention relates, in general, to the field of drilling and processing of wells. More particularly, present embodiments relate to a system and method for detecting wear in rig equipment during subterranean operations.

BACKGROUND

Subterranean operations often include tripping segmented tubular strings into and out of a wellbore. Wellbores can extend several thousand meters into a subterranean formation to reach reservoirs of hydrocarbon fluids. Tripping of the tubular string into and out of the wellbore can require holding the tubular string via a retention feature in a drill floor such that the weight of the tubular string is held by the retention feature while a tubular segment is being connected to the tubular string or removed from the tubular string. The retention feature can include a plurality of grippers, each with an engagement surface that engages the tubular string when the retention feature is activated, such that the grippers hold the tubular string suspended from the retention feature. The engagement surfaces are disengaged from the tubular string to allow axial movement of the tubular string in the wellbore, such as when the tubular string is connected to a top drive.

As the retention feature is used to selectively engage and disengage the tubular string during subterranean operations, the grippers of the retention feature can degrade to a point that they are no longer able to substantially prevent axial or horizontal movement of the tubular string when the tubular string is being help by the retention feature. At this point, the grippers of the retention feature can be removed and replaced by new grippers to again apply an appropriate engagement force to the tubular string to substantially prevent axial or horizontal movement of the tubular string in the retention feature when the retention feature is engaged with the tubular string. Currently, the grippers are generally replaced on a periodic maintenance schedule that is designed to ensure that a wear status of the retention feature (e.g. the grippers) remains below a threshold of wear. However, this periodic schedule may not take into account all factors that cause wear on the grippers. Therefore, if the wear of the grippers exceeds the wear threshold before the periodic replacement time is scheduled (e.g. an actual life cycle of the grippers is less than a predicted life cycle of the grippers), the tubular string may begin slipping (e.g. axial movement of the tubular string) before the grippers are replaced. Movement of the tubular string, while other equipment is operating on the tubular string, may damage the other equipment which may not be equipped to support the entire weight of the tubular string. Therefore, improvements in identifying a wear status of the retention feature in real time on a rig are continually needed.

SUMMARY

In accordance with an aspect of the disclosure, a system for conducting a subterranean operation can include a retention feature in a drill floor configured to suspend a tubular string from the drill floor via engagement of the retention feature with the tubular string, and imaging system configured to capture images of a portion of the tubular string that extends above the drill floor, with the images containing a visible feature of the tubular string, and a processor coupled to the imaging system and configured to detect a change in a position of the visible feature across the images while the tubular string is engaged with the retention feature, and the processor configured to calculate a wear status of the retention feature based on the change in the position of the visible feature.

In accordance with another aspect of the disclosure, a method of conducting a subterranean operation that can include the operations of engaging, via a retention feature, a tubular string that extends through a drill floor of a rig, capturing images, via an imaging system, of a portion of the tubular string that extends above the drill floor, with the portion including a visible feature of the tubular string; communicating the images to a processor that is coupled to the imaging system, detecting, via the processor, a change in a position of the visible feature across the images while the tubular string is engaged with the retention feature based on the images, and calculating a wear status of the retention feature based on the detecting of the change in the position of the visible feature.

BRIEF DESCRIPTION OF THE DRAWINGS

These and other features, aspects, and advantages of present embodiments will become better understood when the following detailed description is read with reference to the accompanying drawings in which like characters represent like parts throughout the drawings, wherein.

DETAILED DESCRIPTION

Present embodiments provide an imaging system for detecting a wear status of the retention feature in the drill floor of a rig, without contacting the tubular string. The aspects of various embodiments are described in more detail below.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

The use of the word "about", "approximately", or "substantially" is intended to mean that a value of a parameter is close to a stated value or position. However, minor differences may prevent the values or positions from being exactly as stated. Thus, differences of up to ten percent (10%) for the value are reasonable differences from the ideal goal of exactly as described. A significant difference can be when the difference is greater than ten percent (10%). As used herein, "substantially prevents slippage" refers to allowing a small amount of slippage of a tubular string in the retention feature. The small amount can be as much as 10 centimeters (~4 inches) of axial movement, as much as 5 centimeters (~2 inches) of horizontal movement, or both.

Figure 1:
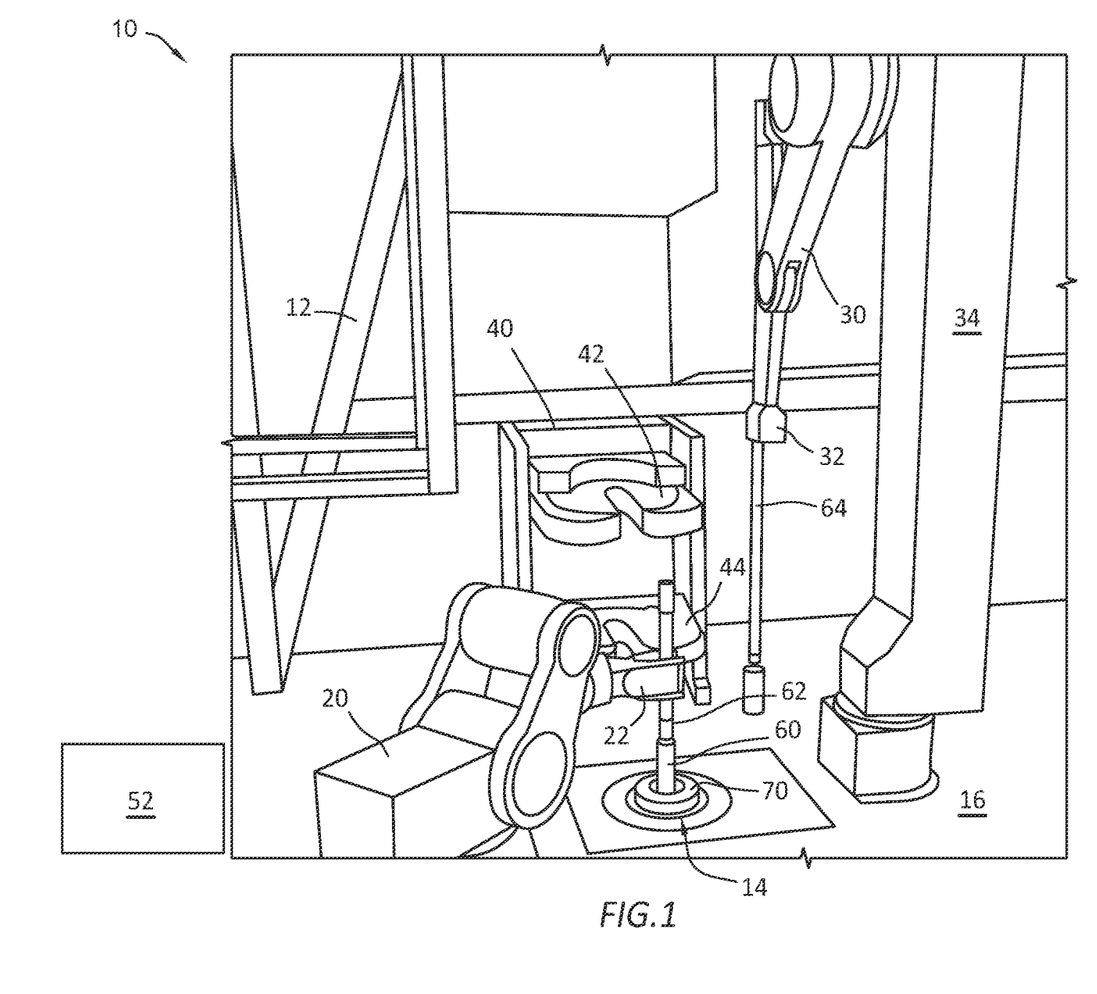
FIG. 1 is a representative perspective view of rig equipment, including a retention feature, that is used during subterranean operations (e.g. drilling a wellbore), in accordance with certain embodiments.

FIG. 1 is a representative perspective view of various rig equipment on a rig 10 with the derrick 12 providing the structure for the rig 10. The rig equipment on the rig floor 16 can be used in performing subterranean operations (e.g. drilling a wellbore, producing fluids from a wellbore, treating a wellbore, completing a wellbore, killing a wellbore, etc.). The equipment can include a drill floor robot 20 that can interact with the tubular string 60 by attaching/removing tools at the top of the tubular string 60 via an end effector 22 (e.g. a gripper). A roughneck 40 can be used to make/break a connection in the tubular string 60 using the upper tong 42 and the lower tong 44 to torque/untorque the connection. A pipe handler 30 with an end effector 32 (e.g. a gripper) can manipulate tubular segments 64 to and from the well center 14 for connecting to or removing from the tubular string 60. The pipe handler 30 can be mounted to a rotatable structure 34 for manipulating the tubular segment 64 between storage locations and the well center 14. As used herein, "tubular segment" refers to a single tubular or a tubular stand that includes multiple tubulars. As used herein, "tubular string" refers to tubular segments that are connected together and extended through the retention feature 70 (or slips 70) toward the wellbore (not shown). "The tubular string 60" can refer to multiple tubular strings. As used herein, "a tubular string" or "the tubular string" refers to a tubular string that is extended through the retention feature 70. Therefore, if one tubular string is removed from the retention feature 70 and another tubular string is then extended through the retention feature 70, both tubular strings can be referred to as "a tubular string" or "the tubular string" even though they are present in the retention feature at different times.

When tripping the tubular string 60 into the wellbore, tubular segments 64 can be retrieved from storage locations (e.g. horizontal storage, vertical storage, mouse hole, etc.), placed at well center 14, transferred from the pipe handler 30 to a top drive (not shown), and extended into the wellbore through the retention feature 70 at the well center 14. When the top drive has extended the tubular segment 64 (now part of the tubular string 60) into the wellbore a desired distance (preferably with a stump 62 of the tubular string 60 protruding from the retention feature 70), then the retention feature 70 can be activated to engage the tubular string 60. A rig controller 52 (or operator) can then transfer the weight of the tubular string 60 from the top drive to the retention feature 70, were the retention feature 70 is holding the entire weight of the tubular string 60 as it extends into the wellbore. With the retention feature 70 holding the tubular string 60, the top drive can move up and out of the way to allow the pipe handler 30 to present another tubular segment 64 to the well center 14 and thread the tubular segment 64 onto the top segment of the tubular string 60. The iron roughneck 40 can then torque the new connection. The top drive can then engage the top joint of the tubular string 60 and the rig controller 52 (or other controller) can transfer the weight of the tubular string 60 from the retention feature 70 to the top drive. The top drive can then extend the tubular string 60 into the wellbore a desired distance to again leave a stump 62 of the tubular string 60 sticking out of the retention feature 70. This process is repeated until the desired length of the tubular string 60 in the wellbore is achieved.

When tripping the tubular string 60 out of the wellbore, tubular segments 64 can be removed from the tubular string 60 at well center 14 and transferred to storage locations (e.g. horizontal storage, vertical storage, mouse hole, etc.). The top drive can raise the tubular string 60 from the wellbore a desired distance such that a tubular segment 64 is above the retention feature 70. The desired distance can be the distance required to allow a stump 62 of the drill string 60 to remain protruding from the retention feature 70 when the tubular segment 64 is removed from the tubular string 60. When the top drive has raised the tubular string 60 from the wellbore the desired distance, the rig controller 52 can transfer the weight of the tubular string 60 from the top drive to the retention feature 70. The iron roughneck 40 can untorque the connection, then the pipe handler 30 can unthread the connection, thereby releasing the tubular segment 64 from the tubular string 60. The pipe handler 30 can then transport the tubular segment 64 to a storage location. The top drive can then move down to engage the top of the tubular string 60 and again raise the tubular string 60 out of the wellbore the desired distance. This process is repeated until the tubular string 60 is removed from the wellbore.

Figure 2:
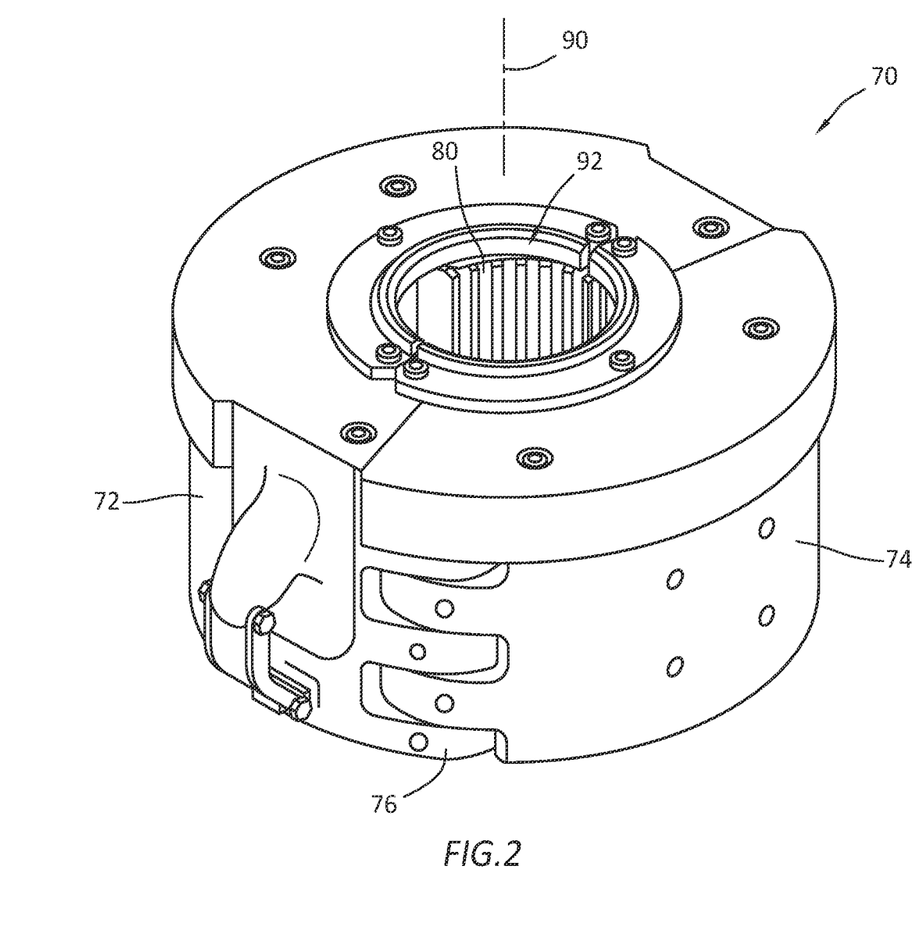
FIG. 2 is a representative perspective view of an example of a retention feature used during subterranean operations, in accordance with certain embodiments.

FIG. 2 is a representative perspective view of an example of a retention feature 70 that can be used during subterranean operations. The retention feature 70 can include a plurality of grippers 80 that surround a passage 92 that can extend through the retention feature 70 along an axis 90. The grippers 80 can be supported and activated by a housing of the retention feature 70. The housing can include housing segments 72, 74 that are linked together at hinge plates 76.

Figure 3:
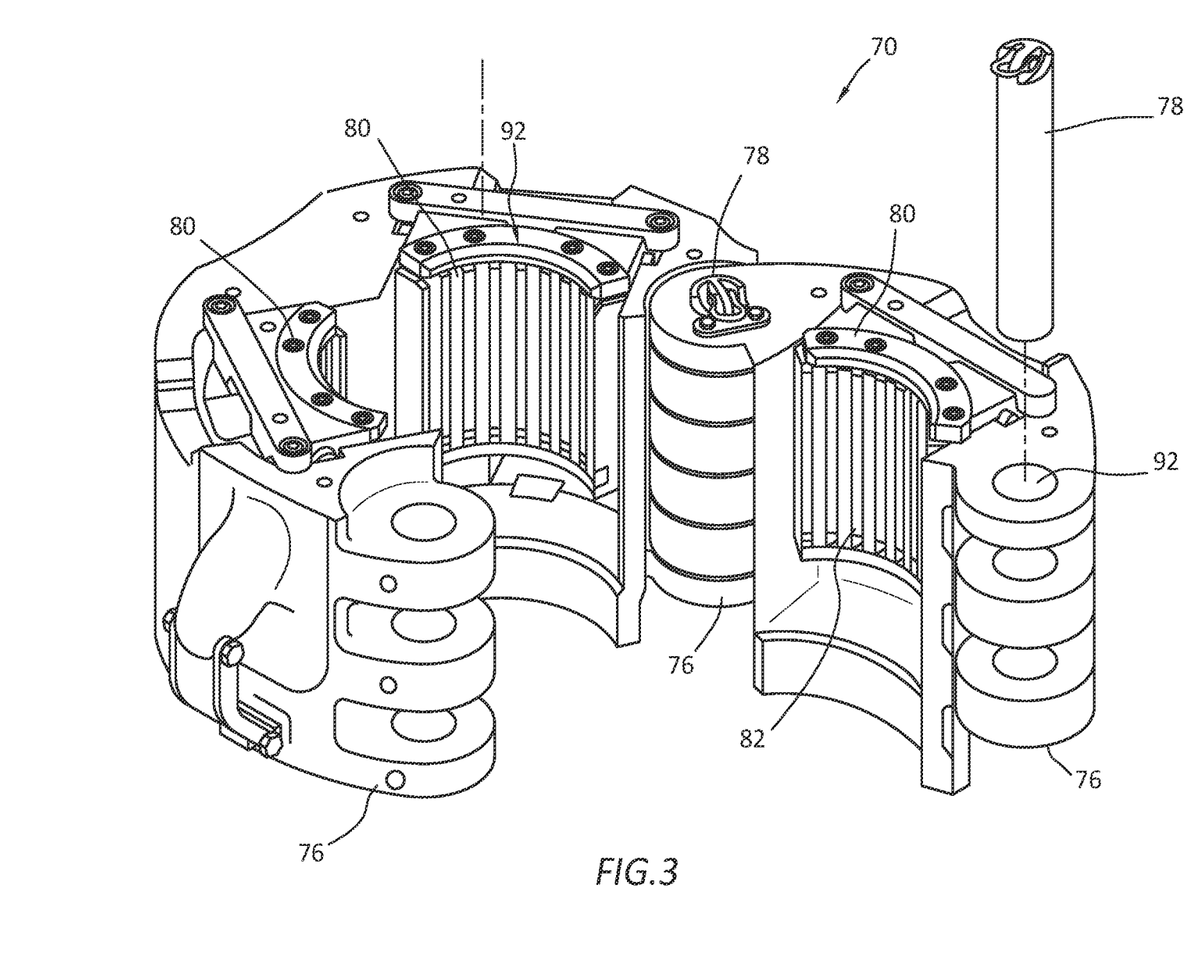
FIG. 3 is a representative perspective view of the retention feature of FIG. 2 with a housing of the retention feature open to reveal grippers inside, in accordance with certain embodiments.

FIG. 3 is a representative perspective view of the example a retention feature 70 shown in FIG. 2 with the housing of the retention feature 70 open to reveal grippers 80. The housing segments 72, 74 can have hinge plates 76 at each end. The hinge plates 76 of the housing segments 72, 74 can interleave each other such that a pin 78 can be inserted through holes 92 in each of the hinge plates 76 for each housing segments 72, 74. The grippers 80 are positioned around the passage 92, through which a tubular string 60 can be extended. When the housing is closed (as in FIG. 2) the grippers 80 can be radially extended inwardly to engage the tubular string 60 via an engagement surface 82 of each gripper 80. Retracting the grippers 80 radially away from the axis 90 can release (or disengage) the tubular string 60 and allow axial movement of the tubular string 60 through the retention feature 70. By continually transferring the weight of the tubular string to/from the retention feature 70, the engagement surface 82 of each gripper 80 continues to wear. At some point the engagement surfaces 82 can no longer engage the tubular string 60 with enough force to prevent axial movement (and possibly horizontal movement or a combination of both) of the tubular string 60.

Figure 4:
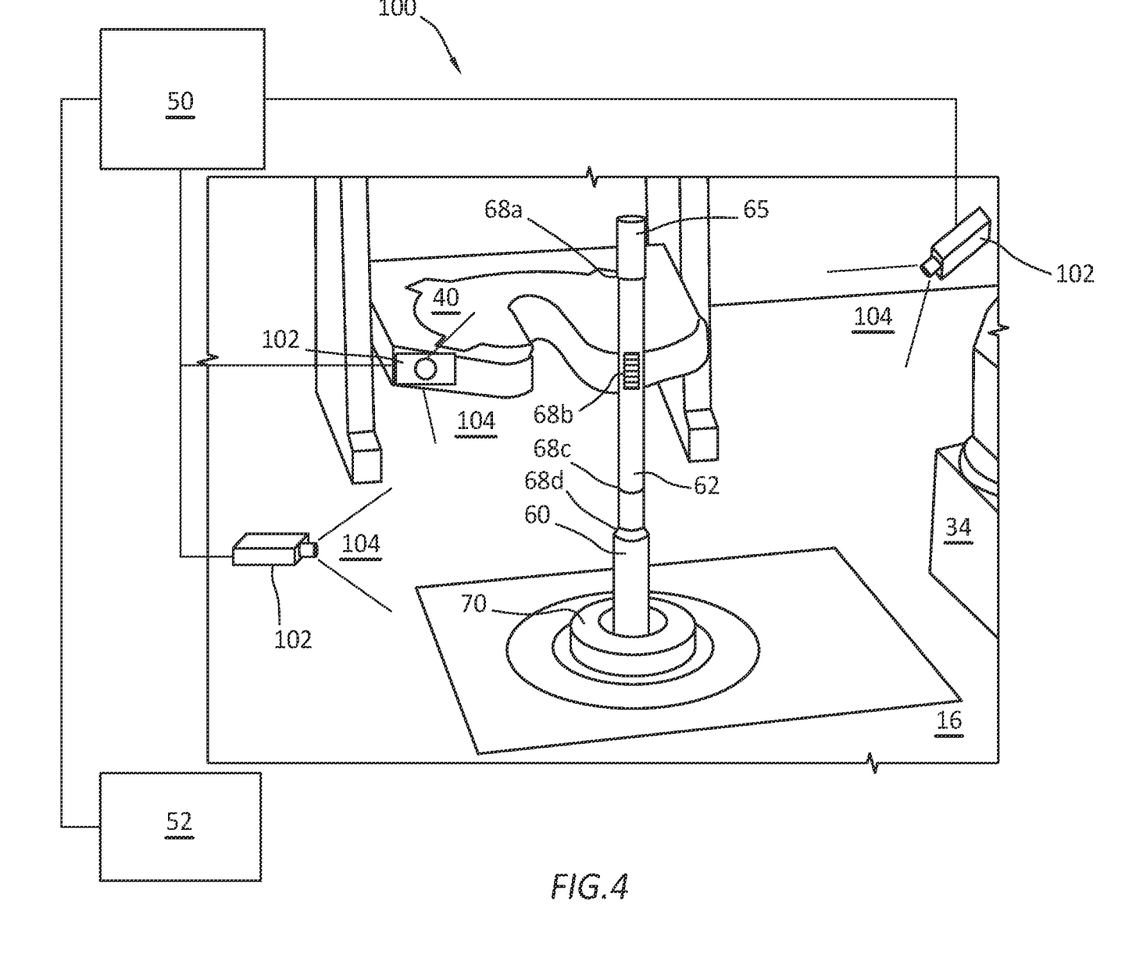
FIGS. 4 and 5 are a representative perspective views of an imaging system used to detect wear status of a retention feature on a rig, in accordance with certain embodiments.

FIG. 4 is a representative functional block diagram of an imaging system 100 that can be used to detect a wear status of the retention feature 70. More particularly, the imaging system 100 can be used to detect a wear status of the engagement surfaces 82 of the grippers 80 in the retention feature 70. The wear status of the retention feature 70 can indicate if the wear of the retention feature 70 (e.g. the engagement surfaces 82) has or has not degraded past a pre-determined threshold of wear. The imaging system 100 can include one or more imaging sensors 102 that are communicatively coupled to the processor 50. Each of the imaging sensors 102 can have a field of vision 104 that allows captured images to include a portion of the tubular string 60 and at least one visible feature (e.g. visible features 68a-d). The imaging sensors 102 can be positioned on the rig 10 at any location, such as on the derrick 12, on rig equipment (e.g. the iron roughneck 40, drill floor robot 20, etc.), or other structures on the rig 10. An imaging sensor 102 can capture images that include a visible feature 68a-d and communicate these images to a processor for image processing.

These visible features 68a-d can be anything on the stump 62 that can be recognized by the imaging system 100 and compared between multiple images to detect movement of the visible feature 68a-d (and thus movement of the tubular string 60). The visible features 68a-d are generally spaced away from the top 65 of the tubular string 60. For examples, the visible feature 68a can be the bottom edge of the box end of the connector positioned at the top of the stump 62. The visible feature 68b can be a visible pattern (e.g. bar code, Q-code, colored pattern, rings around the tubular, physical features, protrusions, recesses, etc.) on the stump 62. The visible feature 68c can be one or more rings around the stump 62 (e.g. colored band, physical indention, physical protrusion, etc.). The visible feature 68d can be a location on the stump 62 that is a transition between a smaller outer diameter to a larger outer diameter. Any of these visible features 68a-d can be used by the processor 50 in the imaging system 100 to determine a wear status of the retention feature 70.

The processor 50 can be communicatively coupled to the rig controller 52 for communicating the wear status of the retention feature 70, so the rig controller 52 can initiate maintenance operations to replace the grippers 80 in the retention feature 70 if the wear status indicates wear of the grippers 80 is past a pre-determined threshold. It should be understood that the processor 50 can include one or more processors, and the rig controller 52 can include one or more processors. It should also be understood that the processor 50 and the rig controller 52 can be the same processor, such that the processor 50 functions and the rig controller 52 functions are performed by the same one or more processors. The imaging system 100 can include a non-transitory memory system that can store processor instructions or other data, such as historical information related to the wear status of the retention feature 70.

Figure 5:
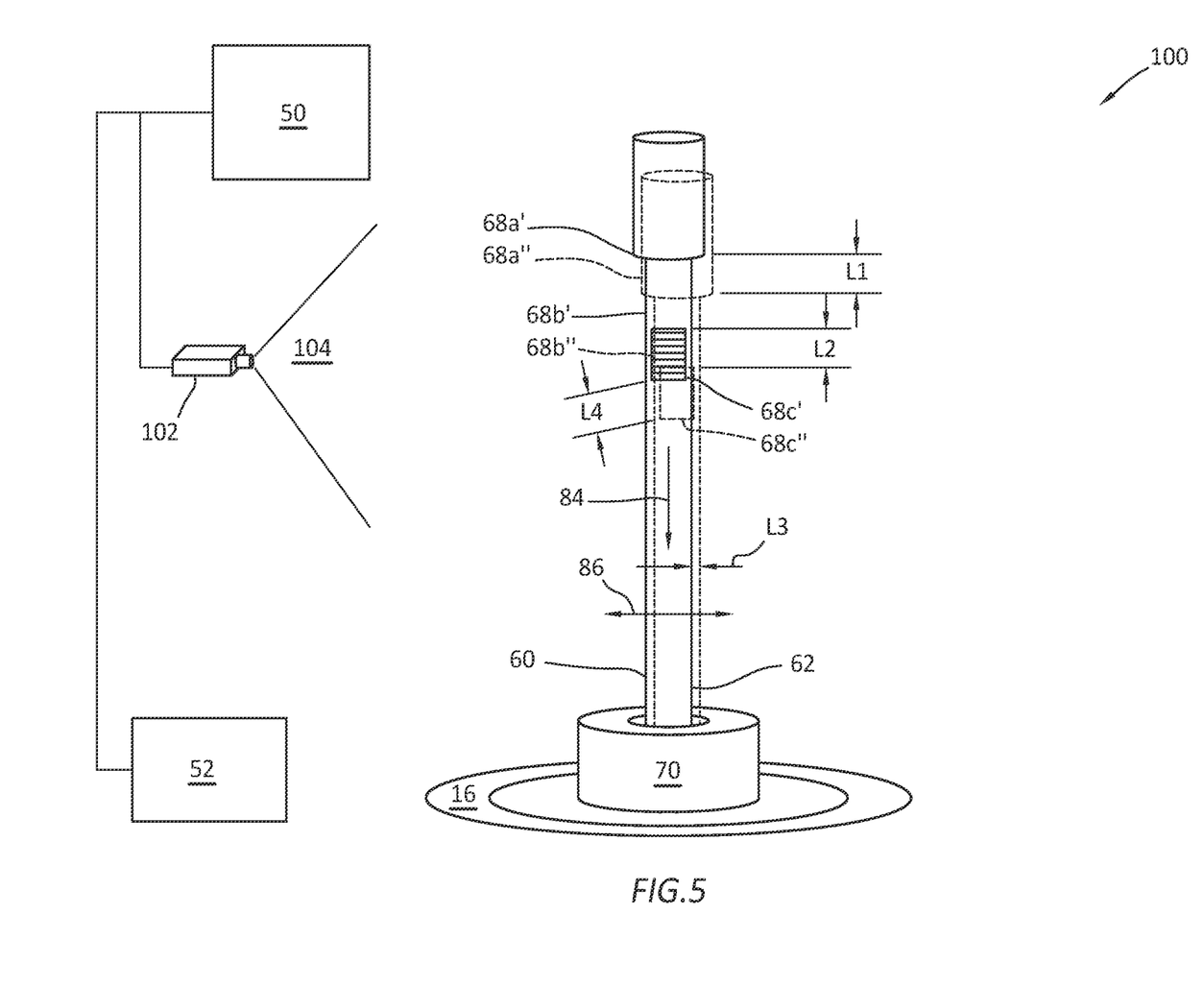

FIG. 5 is another representative functional block diagram of an imaging system 100 that can be used to detect a wear status of the retention feature 70. The imaging system 100 can capture images of at least one visible feature (only visible features 68a, 68b, 68c are shown in FIG. 5) while the retention feature 70 is engaged with the tubular string 60. Image processing performed by the processor 50 can determine a position of the visible feature 68a-d in the image and compare it to a position of the visible feature 68a-d in previously captured images. If the position of the visible feature 68a-d varies between the captured images less than a pre-determined distance, this can indicate that the retention feature 70 is applying sufficient retention force to the tubular string 60 to hold the tubular string 60 in place to allow the other operations (such as making or breaking connections) to occur without damage to the rig equipment. However, if the position of the visible feature 68a-d varies between the captured images by more than the pre-determined distance, this can indicate that the retention feature 70 is not applying sufficient retention force to the tubular string 60 and is allowing the tubular string 60 to slip an unacceptable amount while it is being held by the retention feature 70. This undesirable slippage can cause damage to the other rig equipment. Therefore, the distance the visible feature moves between multiple captured images taken during the same tubular segment connection operation can be used to indicate a wear status of the retention feature 70. The processor 50, if it detects an unacceptable amount of slippage, can communicate an alarm (or action request) to the rig controller 52 which can take appropriate measures to ensure safe operation of the rig equipment, and/or the rig controller 52 can alert an operator who can initiate corrective actions.

In operation, when the retention feature 70 is activated to engage the tubular string 60, the imaging system 100 can capture images while the tubular string 60 is being held by the retention feature 70. The processor 50 can process these images to detect a visible feature (e.g. 68a', 68b', or 68c') on the stump and determine the position of the visible feature in each image. As additional images are captured by the imaging sensor 102 and provided to the processor 50, the processor 50 can continue to determine the position of the visible feature in the additional images and continue to compare the additional images to the previously captured images to determine if the visible feature 68a-d have moved and determine a distance the visible feature 68a-d has moved. The processor 50 can compare the position of the visible feature 68a-d in each of the captured images over a period of time. If the position of the visible feature changes over a period of time, then the tubular string may be moving in the retention feature 70. For example, if the visible feature 68a is detected at position 68a' in images captured at the beginning of a time period when the retention feature 70 is engaging the tubular string 60, and the visible feature 68a is at position 68a" in images captured later in time while the retention feature 70 remains engaged with the tubular string 60, then the processor 50 can determine that the distance L1 can indicate the distance the visible feature 68a moved during the time the retention feature 70 is engaged with the tubular string 60. If the distance L1 is less than or equal to a pre-determined value, then the processor 50 can report to the rig controller 52 (or operator) that the wear status of the retention feature 70 is acceptable and in a safe operating range. If the distance L1 is greater than the pre-determined value, then the processor 50 can report to the rig controller 52 (or operator) that the wear status of the retention feature 70 is unacceptable and not in a safe operating range. The rig controller 52 (or operator) can then initiate maintenance operations to repair the retention feature 70 and restore the retention feature 70 back to a safe operating condition.

In a similar manner, the other visible features (e.g. 68b, 68c, and 68d) can be used by the imaging system 100 to determine a wear status of the retention feature 70. The processor 50 can collect captured images from the image sensors 102 and detect the locations 68b', 68c' of the visible features 68b, 68c. In images acquired later, the processor 50 can detect the locations 68b", and 68c" of the visible features 68b, 68c. Comparing the relative locations 68b', 68c' in the images to the relative locations 68b", 68c" in the later images, the processor 50 can determine the movement (e.g. distance L2, L3, L4) of the tubular string 60 in the retention feature 70. If the distances L2, L3, L4 are less than or equal to a pre-determined value, then the processor 50 can report to the rig controller 52 that the wear status of the retention feature 70 is acceptable and in a safe operating range. If either of the distances L2, L3, L4 is greater than a pre-determined value, then the processor 50 can report to the rig controller 52 that the wear status of the retention feature 70 is unacceptable and may not be in a safe operating range. The rig controller 52 (or operator) can then initiate maintenance operations to repair the retention feature 70 and restore the retention feature 70 back to a safe operating condition.

The most probable failure mode can be axial movement (see arrows 84) of the tubular string 60 while it is being held by the retention feature 70. However, if the tubular string 60 does change its horizontal position (see arrows 86), the imaging system can also detect this horizontal movement and determine that the retention feature 70 may have failed if the horizontal movement is greater than a pre-determined value. The pre-determined value for the axial movement can be 10 cm, or 9 cm, or 8 cm, or 7 cm, or 6 cm, or 5 cm, or 4 cm, or 3 cm, or 2 cm, or 1 cm, or 0.5 cm. The pre-determined value for the horizontal movement can be 5 cm, or 4 cm, or 3 cm, or 2 cm, or 1 cm, or 0.5 cm.

As subterranean operations continue, multiple tubular strings 60 can be tripped into and out of the wellbore. The imaging system 100 can continue to determine wear status for the retention feature 70 each time the retention feature 70 is used to carry the entire weight of the tubular string 60. Each time the image system 100 determines a wear status of the retention feature 70, the imaging system can store the wear status for each time it is calculated as historical information for the retention feature 70. The historical information can be grouped into data sets for each retention feature 70 with a particular set of grippers 80. It is intended that each data set can include all the images captured and wear statuses calculated for a retention feature 70 that has the same set of grippers 80. Therefore, each data set can include the images captured and wear statuses calculated from the time a new set of grippers are installed into the retention feature 70 to the time that this set of grippers is removed, and a replacement set of grippers is installed. The historical information can be stored in a memory system, where the memory system can include non-transitory memory components that are communicatively coupled to the processor 50 or the rig controller 52.

Therefore, the processor 50 can analyze the historical information for a particular retention feature 70 configuration (e.g. one data set of historical information) while the data set is being formed or after the data set is complete to determine trends of the performance of the retention feature 70 and thus the degradation over time of the grippers 80 of the retention feature 70. The processor 50 can determine a life cycle of the retention feature (e.g. the life cycle of the grippers 80) where life cycle is defined as the time when a set of grippers 80 are installed in the retention feature 70 to the time when the set of grippers 80 are removed from the retention feature 70. The calculation of the wear status can also be used to determine the performance of the retention feature 70. For example, if a new set of grippers is recently installed in the retention feature 70 and the wear status is determined to be already at an unacceptable level, then additional evaluation of the retention feature 70 can be performed and other causes of the unacceptable wear status values can be determined. For example, if the hydraulics of a hydraulically actuated retention feature 70 are failing, then even new grippers 80 may not provide sufficient retention force to hold the tubular string 60.

This can possibly be detected within a single data set. However, the failure of the retention feature 70 components other than the grippers 80 can also be detected by comparing the historical information between data sets. For example, if over multiple data sets, the life cycle of grippers 80 continues to be shortened, then this can indicate that the grippers may not be the sole source of the problems. The processor 50 can provide the life cycle information to the rig controller 52 or the operator for further evaluation and possibly additional maintenance operations to correct the other failure mechanisms of the retention feature 70.

This can also be true for other retention features 70 that are operated by other means (e.g. electrical, pneumatic, mechanical, etc.) when these other means fail to operate the retention feature properly. These failures can be detected by the imaging system 100 of this disclosure and possibly prevent additional damage to rig equipment.

Various Embodiments

Embodiment 1. A system for conducting a subterranean operation, the system comprising:
  a retention feature in a drill floor configured to suspend a tubular string from the drill floor via engagement of the retention feature with the tubular string;
  an imaging system configured to capture images of a portion of the tubular string that extends above the drill floor, with the images containing a visible feature of the tubular string; and
  a processor coupled to the imaging system and configured to detect a change in a position of the visible feature across the images while the tubular string is engaged with the retention feature, and
  the processor configured to calculate a wear status of the retention feature based on the change in the position of the visible feature.

Embodiment 2. The system of embodiment 1, wherein the change in the position of the visible feature comprises a movement in an axial direction of the tubular, a movement in a horizontal direction of the tubular, or combinations thereof.

Embodiment 3. The system of embodiment 1, wherein the visible feature is spaced away from a top of the tubular string.

Embodiment 4. The system of embodiment 1, wherein the processor is configured to determine the wear status of the retention feature for each one of multiple connections to a tubular string that is made or broken.

Embodiment 5. The system of embodiment 4, wherein the processor is configured to compare the wear status for one of the multiple connections to the wear status for another one of the multiple connections and determine a trend of the wear status of the retention feature.

Embodiment 6. The system of embodiment 5, wherein the trend of the wear status indicates that the wear status of the retention feature has worsened over time.

Embodiment 7. The system of embodiment 6, wherein the trend predicts that repair of the retention feature is needed.

Embodiment 8. The system of embodiment 1, wherein the processor is configured to calculate the wear status of the retention feature for each time the retention feature is engaged with the tubular string over a period of time.

Embodiment 9. The system of embodiment 8, wherein the processor is configured to determine an actual life cycle of the retention feature based on the calculated wear statuses.

Embodiment 10. The system of embodiment 1, wherein the retention feature comprises one or more grippers, and wherein the wear status of the retention feature indicates wear of the one or more grippers.

Embodiment 11. The system of embodiment 10, wherein the change in the position indicates that replacement of at least one of the one or more grippers is needed.

Embodiment 12. The system of embodiment 10, wherein the change in the position indicates whether or not the wear of the one or more grippers has degraded past a pre-determined threshold of wear.

Embodiment 13. The system of embodiment 12, wherein the change in position is equal to or less than a pre-determined distance, which indicates the wear of the one or more grippers is not degraded past the pre-determined threshold of wear.

Embodiment 14. The system of embodiment 12, wherein the change in position is greater than a pre-determined distance, which indicates that the one or more grippers is degraded past the pre-determined threshold of wear.

Embodiment 15. The system of embodiment 14, wherein the processor is configured to communicate a message to an operator, a main controller, or combinations thereof to schedule a replacement of the one or more grippers when the change in position is greater than the pre-determined distance.

Embodiment 16. The system of embodiment 1, wherein the retention feature comprises a plurality of slips that are configured to engage the tubular string.

Embodiment 17. The system of embodiment 16, wherein the wear status indicates that at least one of the plurality of slips no longer applies an engagement force against the tubular string that substantially prevents movement of the tubular string when the tubular string is engaged with the plurality of slips.

Embodiment 18. A method of conducting a subterranean operation, the method comprising:
engaging, via a retention feature, a tubular string that extends through a drill floor of a rig;
capturing images, via an imaging system, of a portion of the tubular string that extends above the drill floor, with the portion including a visible feature of the tubular string;
communicating the images to a processor that is coupled to the imaging system;
detecting, via the processor, a change in a position of the visible feature across the images while the tubular string is engaged with the retention feature based on the images; and
calculating a wear status of the retention feature based on the detecting of the change in the position of the visible feature.

Embodiment 19. The method of embodiment 18, wherein calculating the wear status comprises calculating that the wear status is equal to or less than a pre-determined threshold of wear for the retention feature and that the retention feature is operating properly.

Embodiment 20. The method of embodiment 18, wherein calculating the wear status comprises calculating that the wear status is greater than a pre-determined threshold of wear for the retention feature and that the wear status indicates the retention feature is operating improperly.

Embodiment 21. The method of embodiment 18, wherein detecting the change further comprises detecting a movement in an axial direction of the tubular, detecting a movement in a horizontal direction of the tubular, or combinations thereof.

Embodiment 22. The method of embodiment 18, wherein the retention feature comprises a plurality of grippers, with each gripper comprising a gripping surface.

Embodiment 23. The method of embodiment 22, further comprising applying a gripping force to the tubular string via the gripping surfaces, wherein the gripping force retains the tubular string in the retention feature when the retention feature is engaged with the tubular string and the wear status of the retention feature is equal to or less than a pre-determined threshold of wear for the retention feature.

Embodiment 24. The method of embodiment 22, further comprising applying a gripping force to the tubular string via the gripping surfaces, wherein the gripping force allows the change in the position of the visible feature while the tubular string is engaged with the retention feature and the wear status of the retention feature is greater than a pre-determined threshold of wear for the retention feature.

Embodiment 25. The method of embodiment 18, wherein calculating the wear status further comprises calculating, via the processor, a wear status for each time a connection to the tubular string is made or broken, thereby calculating, via the processor, multiple wear statuses while tripping the tubular string.

Embodiment 26. The method of embodiment 25, further comprising calculating a trend of the wear status by comparing the multiple wear statuses to each other.

Embodiment 27. The method of embodiment 26, further comprising predicting that the retention feature needs to be repaired in a future time period based on the trend.

Embodiment 28. The method of embodiment 18, wherein the retention feature comprises a plurality of grippers that are configured to engage the tubular string.

Embodiment 29. The method of embodiment 28, wherein the wear status indicates that at least one of the plurality of grippers no longer applies an engagement force against the tubular string that substantially prevents movement of the tubular string when the tubular string is engaged with the plurality of grippers.

Embodiment 30. The method of embodiment 18, wherein calculating the wear status further comprises calculating, via the processor, a wear status for each time the retention feature is engaged with a tubular string.

Embodiment 31. The method of embodiment 30, further comprising collecting, via the processor, historical information for the retention feature by collecting, via the processor, the wear status for each time the retention feature is engaged with the tubular string over a period of time and storing the historical information in a memory system that is coupled to the processor.

Embodiment 32. The method of embodiment 31, determining, via the processor, an actual life cycle of the retention feature based on the historical information.

Embodiment 33. The method of embodiment 32, determining, via the processor, that the actual life cycle of the retention feature is different than a predicted life cycle.

While the present disclosure may be susceptible to various modifications and alternative forms, specific embodiments have been shown by way of example in the drawings and tables and have been described in detail herein. However, it should be understood that the embodiments are not intended to be limited to the particular forms disclosed. Rather, the disclosure is to cover all modifications, equivalents, and alternatives falling within the spirit and scope of the disclosure as defined by the following appended claims. Further, although individual embodiments are discussed herein, the disclosure is intended to cover all combinations of these embodiments.

What is claimed is:

1. A method of conducting a subterranean operation, the method comprising:
engaging, via a retention feature, a tubular string that extends through a drill floor of a rig;
capturing images, via an imaging system, of a portion of the tubular string that extends above the drill floor, with the portion including a visible feature of the tubular string;
communicating the images to a processor that is coupled to the imaging system;
detecting, via the processor, a change in a relative position of the visible feature across the images while the tubular string is engaged with the retention feature, wherein the change indicates movement of the tubular string while the tubular string is engaged with the retention feature; and calculating, via the processor, a wear status of the retention feature based on the change in the relative position of the visible feature across the images; and
applying a gripping force to the tubular string via the retention feature,
wherein the gripping force allows the change in the relative position of the visible feature while the tubular string is engaged with the retention feature and the wear status of the retention feature is greater than a pre-determined threshold of wear for the retention feature, or
wherein the gripping force retains the tubular string in the retention feature when the retention feature is engaged with the tubular string and the wear status of the retention feature is equal to or less than the pre-determined threshold of wear for the retention feature.

2. The method of claim 1, wherein calculating the wear status comprises calculating that the wear status is greater than the pre-determined threshold of wear for the retention feature and that the wear status indicates the retention feature is operating improperly.

3. The method of claim 1, wherein detecting the change further comprises detecting a movement in an axial direction of the tubular, detecting a movement in a horizontal direction of the tubular, or combinations thereof.

4. The method of claim 1, wherein the retention feature comprises a plurality of grippers, with each gripper comprising a gripping surface that is configured to engage the tubular string.

5. The method of claim 4, further comprising applying the gripping force to the tubular string via the gripping surfaces.

6. The method of claim 4, wherein the wear status of the retention feature indicates wear of at least one of the plurality of grippers.

7. The method of claim 4, wherein the wear status indicates that at least one of the plurality of grippers applies an insufficient engagement force against the tubular string to substantially prevent movement of the tubular string when the tubular string is engaged with the plurality of grippers.

8. The method of claim 1, wherein calculating the wear status further comprises calculating, via the processor, a wear status for each time a connection to the tubular string is made or broken, thereby calculating, via the processor, multiple calculated wear statuses while tripping the tubular string.

9. The method of claim 8, further comprising calculating a trend of the wear status by comparing the multiple calculated wear statuses to each other.

10. The method of claim 9, further comprising predicting that the retention feature needs to be repaired in a future time period based on the trend.

11. The method of claim 1, wherein calculating the wear status further comprises calculating, via the processor, a wear status for each time the retention feature is engaged with a tubular string.

12. The method of claim 11, further comprising collecting, via the processor, historical information for the retention feature by collecting, via the processor, the wear status for each time the retention feature is engaged with the tubular string over a period of time and storing the historical information in a memory system that is coupled to the processor.

13. The method of claim 12, determining, via the processor, an actual life cycle of the retention feature based on the historical information.

14. A system for conducting a subterranean operation, the system comprising:
a retention feature in a drill floor configured to suspend a tubular string from the drill floor via engagement of the retention feature with the tubular string;
an imaging system configured to capture images of a portion of the tubular string that extends above the drill floor, with the images containing a visible feature of the tubular string; and
a processor coupled to the imaging system and configured to detect a change in a relative position of the visible feature in the images while the tubular string is engaged with the retention feature, wherein the change indicates movement of the tubular string while the tubular string is engaged with the retention feature, and
the processor configured to calculate a wear status of the retention feature based on the change in the relative position of the visible feature across the images based on a comparison between the images of the relative position of the visible feature, wherein a gripping force applied to the tubular string via the retention feature allows the change in the relative position of the visible feature while the tubular string is engaged with the retention feature and the wear status is greater than a pre-determined threshold of wear for the retention feature, or
wherein the gripping force retains the tubular string in the retention feature when the retention feature is engaged with the tubular string and the wear status is less than or equal to the pre-determined threshold of wear for the retention feature.

15. The system of claim 14, wherein the change in the relative position of the visible feature comprises a movement of the tubular in an axial direction, a movement of the tubular in a horizontal direction, or combinations thereof.

16. The system of claim 14, wherein the visible feature is spaced away from a top of the tubular string.

17. The system of claim 14, wherein the processor is configured to determine the wear status of the retention feature for each one of multiple connections to a tubular string that is made or broken.

18. The system of claim 17, wherein the processor is configured to compare the wear status for one of the multiple connections to the wear status for at least another one of the multiple connections and determine a trend of the wear status of the retention feature.

19. The system of claim 18, wherein the trend of the wear status indicates that:
   the wear status of the retention feature has worsened over time,
   one or more grippers of the retention feature have degraded past an acceptable wear level,
   components of the retention feature other than the one or more grippers have failed, or
   combinations thereof.

20. A system for conducting a subterranean operation, the system comprising:
   a retention feature in a drill floor configured to suspend a tubular string from the drill floor via engagement of the retention feature with the tubular string;
   an imaging system configured to capture images of a portion of the tubular string that extends above the drill floor, with the images containing a visible feature of the tubular string; and
   a processor coupled to the imaging system and configured to detect a change in a relative position of the visible feature in the images while the tubular string is engaged with the retention feature, and
   the processor configured to calculate a wear status of the retention feature based on the change in the relative position of the visible feature based on a comparison between the images of the relative position of the visible feature,
   wherein a gripping force applied to the tubular string via the retention feature allows the change in the relative position of the visible feature while the tubular string is engaged with the retention feature and the wear status is greater than a pre-determined threshold of wear for the retention feature, or wherein the gripping force retains the tubular string in the retention feature when the retention feature is engaged with the tubular string and the wear status is less than or equal to the pre-determined threshold of wear for the retention feature,
   wherein the processor is configured to calculate the wear status of the retention feature for each time the retention feature is engaged with the tubular string over a period of time, and wherein the processor is configured to determine an actual life cycle of the retention feature based on the calculated wear statuses.

* * * * *